(12) United States Patent
Luengen et al.

(10) Patent No.: US 8,933,958 B2
(45) Date of Patent: Jan. 13, 2015

(54) ENHANCED USER INTERFACE ELEMENTS IN AMBIENT LIGHT

(71) Applicant: Microsoft Corporation, Redmond, WA (US)

(72) Inventors: Ross N. Luengen, Sammamish, WA (US); Michael H. LaManna, Bothell, WA (US); Gavin M. Gear, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/968,212

(22) Filed: Aug. 15, 2013

(65) Prior Publication Data

US 2013/0335389 A1    Dec. 19, 2013

Related U.S. Application Data

(63) Continuation of application No. 12/257,596, filed on Oct. 24, 2008, now Pat. No. 8,514,242.

(51) Int. Cl.
  *G09G 5/00* (2006.01)
  *G09G 5/10* (2006.01)
  *G06F 3/14* (2006.01)
  *G06F 9/44* (2006.01)

(52) U.S. Cl.
  CPC .. *G09G 5/10* (2013.01); *G06F 3/14* (2013.01); *G06F 9/4443* (2013.01); *G09G 5/00* (2013.01); *G09G 2340/14* (2013.01); *G09G 2360/144* (2013.01)
  USPC .......... 345/606; 345/581; 345/589; 345/619; 345/207; 345/690; 715/821; 715/864; 715/866

(58) Field of Classification Search
  None
  See application file for complete search history.

(56) References Cited

U.S. PATENT DOCUMENTS

| 6,094,185 | A  | 7/2000  | Shirriff        |
|-----------|----|---------|-----------------|
| 6,961,461 | B2 | 11/2005 | MacKinnon et al.|
| 6,995,749 | B2 | 2/2006  | Friend          |
| 7,064,759 | B1 | 6/2006  | Feierbach       |

(Continued)

OTHER PUBLICATIONS

"Avago Technologies Adds Miniature Surface Mount Ambient Light Photo Sensor for use in Portable Electronic Devices", *Business Wire CNET Networks, Inc., a CBS Company*. All rights reserved., http://findarticles.com/p/articles/mi_m0EIN/is_2008_June_30/ai_n27874336,(Jun. 30, 2008), 5 pages.

"Final Office Action", U.S. Appl. No. 12/257,596, (Dec. 18, 2012),13 pages.

(Continued)

*Primary Examiner* — Antonio A Caschera
(74) *Attorney, Agent, or Firm* — John Jardine; Kate Drakos; Micky Minhas

(57) ABSTRACT

Embodiments of enhanced user interface elements in ambient light are described. Sensor inputs can be received from light sensors that detect ambient light proximate an integrated display of a portable device. A determination is made that the ambient light detracts from the visibility of user interface elements displayed in a user interface on the integrated display. Display properties of graphic components of a user interface element are interpolated through a light range from approximately complete darkness to full sunlight, and the graphic components of a user interface element can be modified based on interpolating the display properties within the light range to enhance the visibility of the user interface element for display in the ambient light.

20 Claims, 6 Drawing Sheets

(56) References Cited

U.S. PATENT DOCUMENTS

| | | |
|---|---|---|
| 7,184,056 B2 | 2/2007 | Brody et al. |
| 7,221,374 B2 | 5/2007 | Dixon |
| 7,268,775 B1 | 9/2007 | Gettemy |
| 7,487,458 B2 | 2/2009 | Jalon et al. |
| 8,085,271 B2 | 12/2011 | Clegg et al. |
| 8,514,242 B2 | 8/2013 | Luengen et al. |
| 2005/0037815 A1 | 2/2005 | Besharat et al. |
| 2006/0087245 A1 | 4/2006 | Ng et al. |
| 2006/0256067 A1 | 11/2006 | Montero et al. |
| 2006/0284895 A1 | 12/2006 | Marcu et al. |
| 2007/0146356 A1 | 6/2007 | Ladouceur |
| 2008/0218501 A1 | 9/2008 | Diamond |
| 2010/0103186 A1 | 4/2010 | Luengen |

OTHER PUBLICATIONS

"Final Office Action", U.S. Appl. No. 12/257,596, (Jun. 6, 2012), 19 pages.

"Final Office Action", U.S. Appl. No. 12/257,596, (Sep. 27, 2011), 13 pages.

"Non-Final Office Action", U.S. Appl. No. 12/257,596, (Jan. 31, 2012), 12 pages.

"Non-Final Office Action", U.S. Appl. No. 12/257,596, (May 4, 2011), 11 pages.

"Non-Final Office Action", U.S. Appl. No. 12/257,596, (Aug. 22, 2012), 11 pages.

"Notice of Allowance", U.S. Appl. No. 12/257,596, (Apr. 18, 2013), 9 pages.

Dix, John "iPhone: All in User Interface", Retrieved from: <http://www.networkworld.com/columnists/2007/011507edit.html> on Aug. 6, 2008, Network World,(Jan. 11, 2007), 2 pages.

ENHANCED USER INTERFACE ELEMENTS IN AMBIENT LIGHT

RELATED APPLICATION

This application is a continuation of and claims priority to U.S. patent application Ser. No. 12/257,596 filed Oct. 24, 2008 entitled "Enhanced User Interface Elements in Ambient Light", the disclosure of which is incorporated by reference herein in its entirety.

BACKGROUND

Portable computer devices are increasingly more common and mobile, such as laptop computers, tablet PCs, ultra-mobile PCs, as well as other mobile data, messaging, and/or communication devices. Portable devices, however, are susceptible to environmental conditions and may not be usable in a car or outdoors due to bright sunlight or a dark environment. User interfaces are typically optimized for display on various devices in an indoor environment where lighting can be controlled. Computer graphics and imaging has become more complex, allowing for smaller text, subtle details, and more visual features that can be obscured or imperceptible on the display of a portable device in bright sunlight, or that may be distracting in a dark environment.

Some devices may include a display brightness adjustment for ambient lighting conditions. Typically, a screen display can be adjusted brighter to compensate for bright or high ambient light, or the screen display can be adjusted darker to compensate for low ambient light so that the display is not so glaringly bright. In some device implementations, the display brightness can be adjusted manually by a user of the device, and in other implementations, an ambient light sensor can be utilized to automatically adjust the display brightness. However, adjusting the display brightness only changes the entire display from a low contrast display to a higher contrast display, and vice-versa. Particular elements and/or features of a user interface may still be obscured or imperceptible, such as in bright sunlight even if the display brightness can be adjusted.

SUMMARY

This summary is provided to introduce simplified concepts of enhanced user interface elements in ambient light. The simplified concepts are further described below in the Detailed Description. This summary is not intended to identify essential features of the claimed subject matter, nor is it intended for use in determining the scope of the claimed subject matter.

Enhanced user interface elements in ambient light is described. In various embodiment(s), a sensor input can be received from light sensor(s) that detect ambient light proximate an integrated display of a portable device. A determination can be made that the ambient light detracts from the visibility of user interface elements displayed in a user interface on the integrated display, and graphic components of a user interface element can be modified to enhance the visibility of the user interface element for display in the ambient light.

In other embodiment(s) of enhanced user interface elements in ambient light, the vector graphics or other imaging data that defines each of the graphic components of a user interface element can be redefined to modify the graphic components to enhance the visibility of the user interface element. Further, the graphic components of the user interface element can be individually modified to contrast with a user interface background displayed in the user interface on the integrated display. In an embodiment, the display properties of the graphic components of the user interface element can be interpolated along a normalized light range to modify the graphic components to enhance the visibility of the user interface element for display in the ambient light. For multiple user interface elements displayed in the user interface on the integrated display, the visibility of each user interface element can be individually enhanced and/or each of the graphic components can be individually modified to enhance the visibility of the user interface elements for display in the ambient light.

In other embodiment(s) of enhanced user interface elements in ambient light, the sensor input received from the light sensor(s) that detect the ambient light can be compared to a threshold value that indicates when the ambient light detracts from the visibility of the user interface element displayed in the user interface on the integrated display. The threshold value can indicate that the ambient light is too bright, such as on a sunny day when the portable device is used outdoors and user interface elements do not contrast, or are washed-out, in a lighter colored user interface background in the display of the user interface. Alternatively, the threshold value can indicate that the ambient light is too dark, such as when the portable device is used in a vehicle at night and user interface elements do not contrast, or are indistinguishable, from a darker colored user interface background in the display of the user interface. In another embodiment, the sensor input can be received from multiple light sensors and averaged to determine an averaged ambient light proximate the integrated display of the portable device.

BRIEF DESCRIPTION OF THE DRAWINGS

Embodiments of enhanced user interface elements in ambient light are described with reference to the following drawings. The same numbers are used throughout the drawings to reference like features and components.

DETAILED DESCRIPTION

Embodiments of enhanced user interface elements in ambient light provide that user interface elements can be optimized to enhance visibility and/or readability in adverse ambient lighting conditions. User interface elements, such as any type of image, graphic, text, user-selectable button or control, menu selection, map element, or other displayable feature can be contrasted and modified as individual components to enhance the visibility of each user interface element when displayed in a user interface. The visual enhancement of user interface elements can appear as a seamless transition to improve the overall legibility and/or readability of a user interface to optimize a visual user experience, reduce eye strain, and/or enhance the reading comfort of a user through a range of many lighting conditions, such as from darkness to direct sunlight.

A portable device with an integrated display can include an ambient light sensor, or multiple light sensors, to detect the ambient lighting that is local, incident, in a vicinity, or otherwise proximate the integrated display of the portable device. When the ambient light is detected as being too dark or too bright, and likely to detract from the visibility of a user interface displayed on the integrated display, various user interface elements of the user interface can be individually modified to enhance their visibility in the ambient lighting conditions. The shadows, highlights, and other visual features that can make user interface elements difficult to see in adverse lighting conditions can also be adjusted manually in good lighting conditions to aid in user accessibility.

While features and concepts of the described systems and methods for enhanced user interface elements in ambient light can be implemented in any number of different environments, systems, and/or various configurations, embodiments of enhanced user interface elements in ambient light are described in the context of the following example systems and environments.

Figure 1:
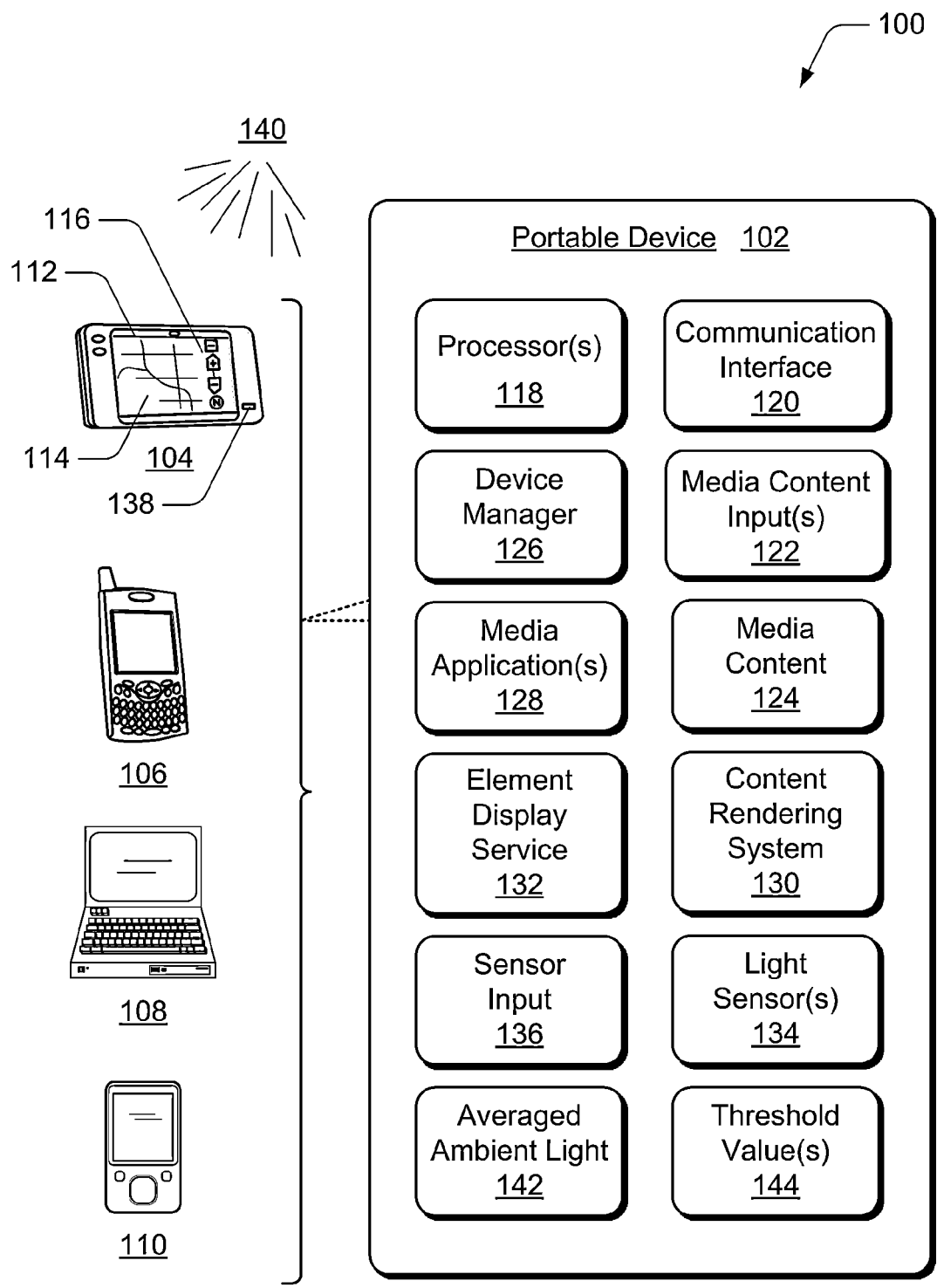
FIG. 1 illustrates an example system in which embodiments of enhanced user interface elements in ambient light can be implemented.

FIG. 1 illustrates an example system 100 in which various embodiments of enhanced user interface elements in ambient light can be implemented. Example system 100 includes portable device 102 (e.g., a wired and/or wireless device) that can be any one or combination of an ultra-mobile personal computer (UMPC) 104, a mobile phone 106 (e.g., cellular, VoIP, WiFi, etc.) that is implemented for data, messaging, and/or voice communications, a portable computer device 108, a media device 110 (e.g., a personal media player, portable media player, etc.), a gaming device, an appliance device, an electronic device, and/or any other type of portable device that can receive, display, and/or communicate data in any form of audio, video, and/or image data. Portable device 102 can also be implemented as a navigation and display system in a vehicle or other form of conveyance.

Each of the various portable devices can include an integrated display and selectable input controls via which a user can input data. For example, UMPC 104 includes an integrated display 112 on which a user interface 114 can be displayed. In this example, the user interface 114 is a navigation map that includes user interface elements 116, such as any type of image, graphic, text, selectable button, user-selectable controls, menu selection, map element, and/or any other type of user interface displayable feature or item.

Any of the various portable devices described herein can be implemented with one or more processors, communication components, media content inputs, memory components, storage media, signal processing and control circuits, and a media content rendering system. Any of the portable devices can also be implemented for communication via communication network(s) that can include any type of a data network, voice network, broadcast network, an IP-based network, and/or a wireless network that facilitates data, messaging, and/or voice communications. A portable device can also be implemented with any number and combination of differing components as described with reference to the example device shown in FIG. 6. A portable device may also be associated with a user (i.e., a person) and/or an entity that operates the device such that a portable device describes logical devices that include users, software, and/or a combination of devices.

In this example, portable device 102 includes one or more processors 118 (e.g., any of microprocessors, controllers, and the like), a communication interface 120 for data, messaging, and/or voice communications, and media content input(s) 122 to receive media content 124. Media content (e.g., to include recorded media content) can include any type of audio, video, and/or image media content received from any media content source, such as television media content, music, video clips, data feeds, interactive games, network-based applications, and any other content. Portable device 102 also includes a device manager 126 (e.g., a control application, software application, signal processing and control module, code that is native to a particular device, a hardware abstraction layer for a particular device, etc.).

Portable device 102 can include various media applications 128 that that can be processed, or otherwise executed, by the processors 118, such as a navigation application that generates the navigation map as user interface 114 for display on UMPC 104. Portable device 102 includes a content rendering system 130 that can render user interfaces from the media applications 128 to generate a display on any of the portable devices. Portable device 102 also includes an element display service 132 that can be implemented as computer-executable instructions and executed by the processors 118 to implement various embodiments and/or features of enhanced user interface elements in ambient light. In an embodiment, the element display service 132 can be implemented as a component or module of the device manager 126.

In this example, portable device 102 includes light sensor(s) 134 that detect ambient light proximate an integrated display of the device and generate sensor input 136 to the element display service 132. In an implementation, the element display service 132 can receive sensor input 136 as an illuminance value that is a measure of the overall magnitude of the ambient light level which is measured in units of LUX, or lumens per square meter. Sensor input 136 can also be implemented to include color temperature which is a measure of the warmth or coolness of the ambient light, and is measured in units of degrees Kelvin. Sensor input 136 can also be implemented to include the characteristic of chromacity which is a spectral characteristic of light based on a 2D coordinate system.

In an embodiment, the element display service 132 at portable device 102 can receive sensor input 136 from multiple light sensors 134 and average the sensor input to determine an averaged ambient light 142 proximate the integrated display of the device. Because ambient light sensors on a device can be partly or fully obscured by shadows or other objects covering the sensor, multiple sensors positioned some distance apart can be implemented to provide an overall approximation of the current lighting conditions. In an implementation, the most recent sensor input data values for each ambient light sensor can be retained, along with the time stamp from a sensor data report for each of the inputs. Based on the most recent sensor input values, the highest sensor input can be used as the sensor input 136 because the highest sensor input is likely received from a light sensor 134 that is not obscured.

In an example, UMPC 104 can include light sensor 138 that senses, or otherwise detects, ambient light 140 (e.g., natural lighting, or location-specific lighting) that is local, incident, in a vicinity, or otherwise proximate the integrated display 112 of the portable device, UMPC 104. The element display service 132 can receive sensor input 136 from light sensor(s) 134 and determine that the ambient light 140 detracts from the visibility of various user interface elements 116 displayed in the user interface 114. For example, shadows, highlights, and other visual features can make user interface elements difficult to see in adverse lighting conditions.

In various embodiments, the element display service 132 can then modify individual graphic components of each user interface element 116 to enhance the visibility of the user interface elements for display in the ambient light. The user interface elements can be visually enhanced to improve the overall legibility and/or readability of a user interface in a transition of the user interface elements that optimizes a visual user experience, reduces eye strain, and/or enhances the reading comfort of a user. The graphic components of a user interface element can be individually modified to contrast with a user interface background displayed in the user interface on the integrated display, and the visibility of each user interface element can be individually enhanced for display in the ambient light. A user interface element 116 can be displayed as a compilation of graphic components, and vector graphics or other imaging data separately defines each graphic component of the user interface element. A vector graphic includes the data that defines how a graphic component of a user interface element is displayed, such as shape, size, and color definitions.

In various embodiments, the element display service 132 can redefine the vector graphics, or otherwise modify imaging data, that defines a graphic component of a user interface element to modify the graphic components to enhance the visibility of the user interface element. Further, the element display service 132 can be implemented to interpolate display properties of the graphic components of the user interface element along a normalized light range to modify the graphic components to enhance the visibility of the user interface element for display in the ambient light. In other embodiments, the element display service 132 can receive sensor input 136 and compare the sensor input to threshold value(s) 144 that indicate when the ambient light 140 detracts from the visibility of the user interface elements 116 displayed in the user interface 114 on the integrated display 112 of a portable device.

Figure 2:
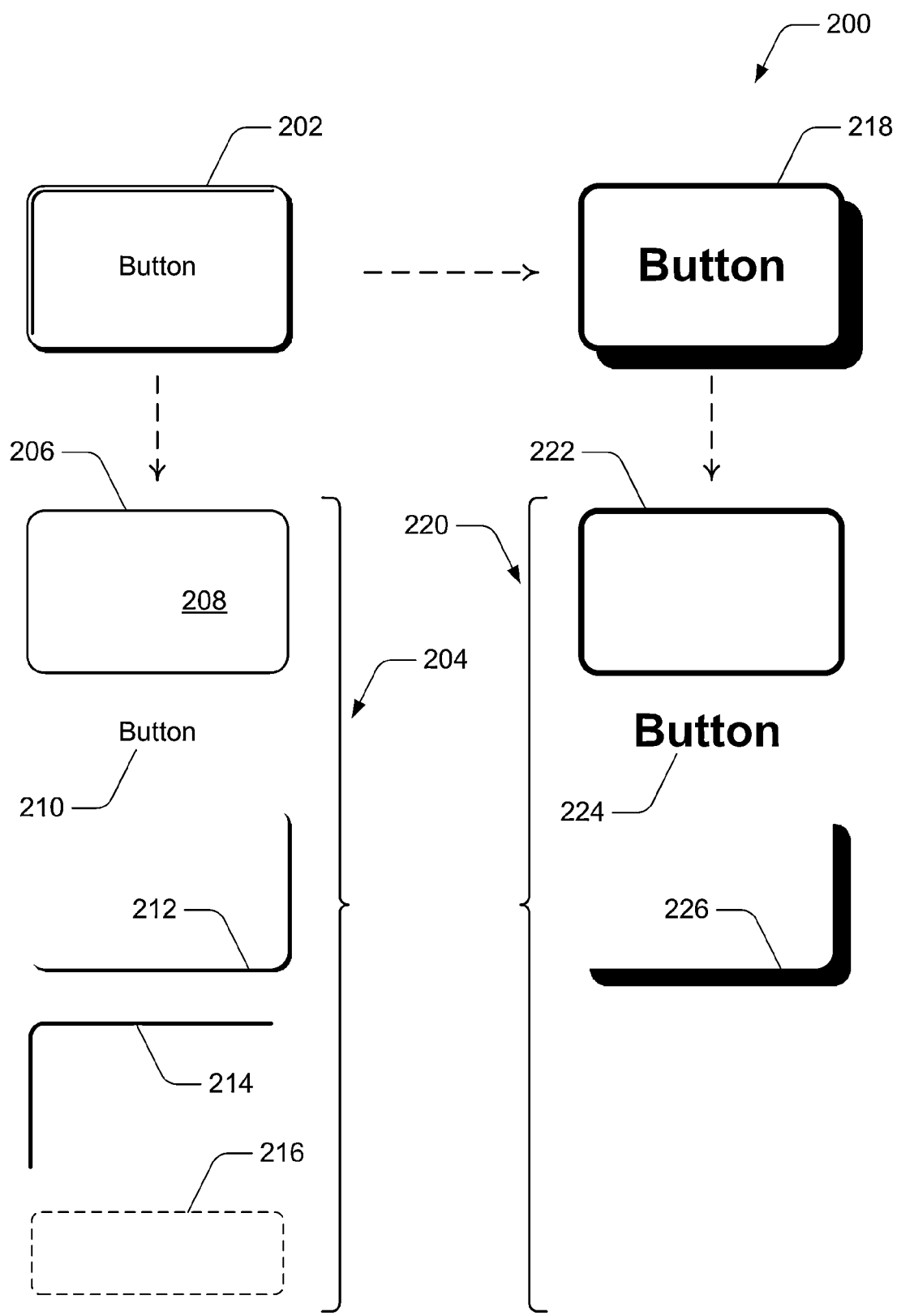
FIG. 2 illustrates an example of an enhanced user interface element in accordance with one or more embodiments.

FIG. 2 illustrates an example 200 of an enhanced user interface element in accordance with one or more embodiments. Example 200 includes a selectable button 202 that can be displayed on a user interface as a user interface element. The selectable button 202 is a composition of individual graphic components 204 that are each defined by vector graphics. In this example, the graphic components 204 include an element border 206, an element color 208 (i.e., separate from the element border 206), element text 210, an element shadow 212, an element highlight 214, and a semi-transparent element feature 216 (e.g., that provides a translucent effect over the top half of the button).

In an embodiment, the element display service 132 (FIG. 1) of a portable device can receive can receive sensor input from light sensor(s) and determine that the ambient lighting conditions detract from the visibility of selectable button 202 (i.e., a user interface element) when displayed in a user interface. The element display service can then individually modify, alter, enhance, or remove any one or combination of the individual graphic components 204 of the selectable button 202 to enhance the visibility of the selectable button for display in the ambient light. For example, an enhanced button 218 can be generated for display in a bright lighting condition that includes enhanced graphic components 220, such as a thicker element border at 222, larger and bolder element text at 224, and a larger offset of the element shadow at 226. In this example, the element highlight 214 and the semi-transparent element feature 216 are removed from a display of the enhanced button 218 because they would likely be washed out in the bright lighting condition. Other enhancements can also be implemented in addition to, or instead of, the enhanced graphic components 220, such as contrasting a color of the element text 210 with the background element color 208, increasing the size of the button itself, and any number of other enhancements.

In various embodiments, the transition from selectable button 202 to the enhanced button 218 can be graduated over a normalized light range as a seamless transition to optimize a visual user experience through a range of many lighting conditions, such as from darkness to direct sunlight. For example, the element border 206 can be transitioned from the border as it appears around selectable button 202, through one or more additional thicknesses, to the appearance of the border around enhanced button 218.

In various embodiments, user interface elements can be scaled to enhance visibility for display in ambient lighting conditions. Generally, larger objects, features, images, graphics, text, and other displayable features of a user interface are easier for a user to see and use when a portable device is utilized in a bright light condition, and the larger user interface content can improve the legibility and/or readability of a user interface. In an embodiment, a zooming function can be utilized to scale user interface elements to enhance their visibility.

In other embodiments, contrast and/or color enhancements can be utilized to enhance visibility for display in ambient light conditions. When an LCD screen is used in a bright lighting condition, the overall contrast of the screen is reduced, such as when sunlight washes out the screen that can cause imperceptible dark areas on the screen. The contrast of the user interface can be increased and/or a monochrome content scheme can be utilized to maximize contrast in a high ambient lighting condition. Another way to increase contrast is to replace low contrast content, such as an aerial photo in a mapping program, with high contrast user interface elements, such as black on white street vector graphics. Color changes can also be utilized to enhance the overall user experience and legibility of rendered content in a user interface. By changing color contrast based on ambient light, content can be displayed more readable in adverse lighting conditions, such as in bright outdoor light, or in dark interior light. Color contrast can be increased utilizing a color saturation technique, or by using complementary colors instead of adjacent colors for enhanced readability, where complementary colors are pairs of colors that have an opposite hue, such as blue and yellow. In another embodiment, color temperature (i.e., a measure of the ambient light in degrees Kelvin) and/or chromacity (i.e., a spectral characteristic of the ambient light) can be utilized to re-color balance a user interface in current or optimal ambient lighting conditions.

Figure 3:
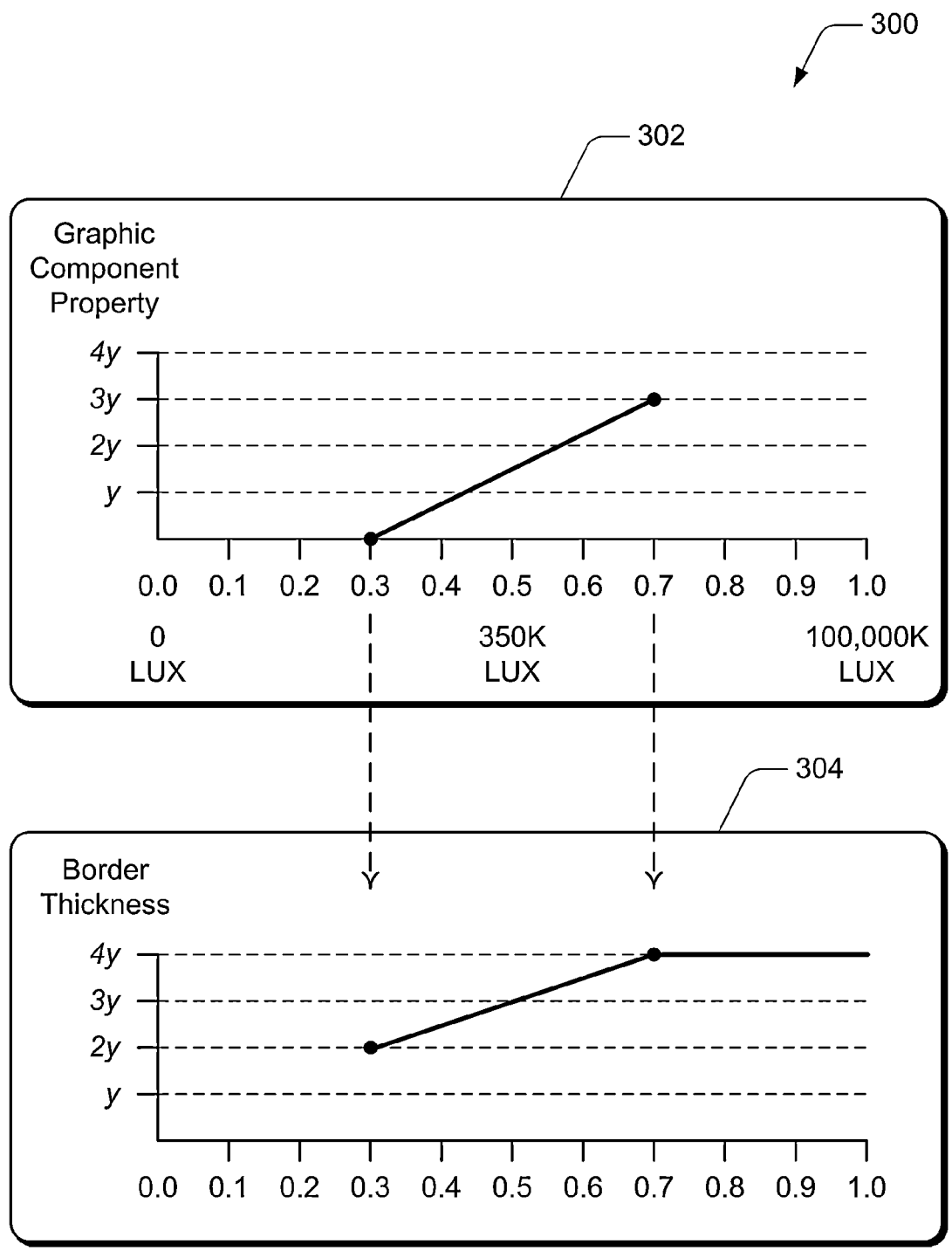
FIG. 3 illustrates an example of a normalized ambient light range in accordance with one or more embodiments.

FIG. 3 illustrates an example 300 of a normalized ambient light range in accordance with one or more embodiments. Example 300 includes a linear interpolation chart 302 that illustrates ambient light normalized to provide an ambient light value ranging from 0.0 to 1.0. In an embodiment, the ambient light value range from 0.0 to 1.0 can correspond to respective illuminance values from 0 LUX to 100,000K LUX. The ambient light value range includes 0.0 as the minimum light and 1.0 as maximum light which approximates values that indicate complete darkness to full sunlight. Normal room ambient light is approximately 0.5.

The linear interpolation 302 can be defined between two values, and the ambient light value along a range of y-values can be defined for each graphic component of a user interface element. Target y-values can include the values corresponding to any of the graphic components for a user interface element, such as color, double, thickness, etc. An equation $v=a+((b-a) \times 1)$ defines the linear interpolation for value types, where "v" is the target value, "a" is the first point, "b" is the second point, and "l" is the progress along the linear interpolation. The interpolation is a function that takes the input ambient light value and maps it to an output y-value. For example, the interpolated y-values can correspond to the thickness of element border 206 (FIG. 2) when transitioning from selectable button 202 to the enhanced button 218 which can be graduated over the normalized light range. A liner interpolation chart 304 for the thickness of the element border 206 illustrates that at 0.3 ambient light value, the element border 206 doubles in thickness (i.e., 2y), and increases in thickness linearly to a 0.7 ambient light value. In other embodiments, the ambient light range may be non-linear.

In an embodiment, the element display service 132 (FIG. 1) can receive sensor input 136 and compare the sensor input to one or more threshold values that indicate when the ambient light detracts from the visibility of user interface elements displayed in a user interface. The ambient light can be compared to a set of user values (e.g., optionally user-configured threshold values) that indicate minimum and maximum lighting preferences. For example, a user may indicate that for any lighting condition between the 0.3 and 0.7 ambient light values, the user interface elements are consistent and not changed. However, if the ambient lighting conditions fall below a 0.3 ambient light value, or are above a 0.7 ambient light value (as referenced in the linear interpolation chart 302), then the element display service 132 can be initiated to modify individual graphic components of each user interface element to enhance the visibility of the user interface elements for display in the ambient light. In an embodiment, a user may optionally configure the range of ambient light values (e.g., as detected by the sensors) to indicate the visibility of user interface elements in various lighting conditions. The overall visibility of a user interface can be configured with user-selectable range controls displayed in a user interface, and/or with selectable and pre-defined display controls, such as any one or combination of selectors for Dark mode, Room mode, Normal mode, Outdoors mode, Sunlight mode, and the like.

Figure 4:
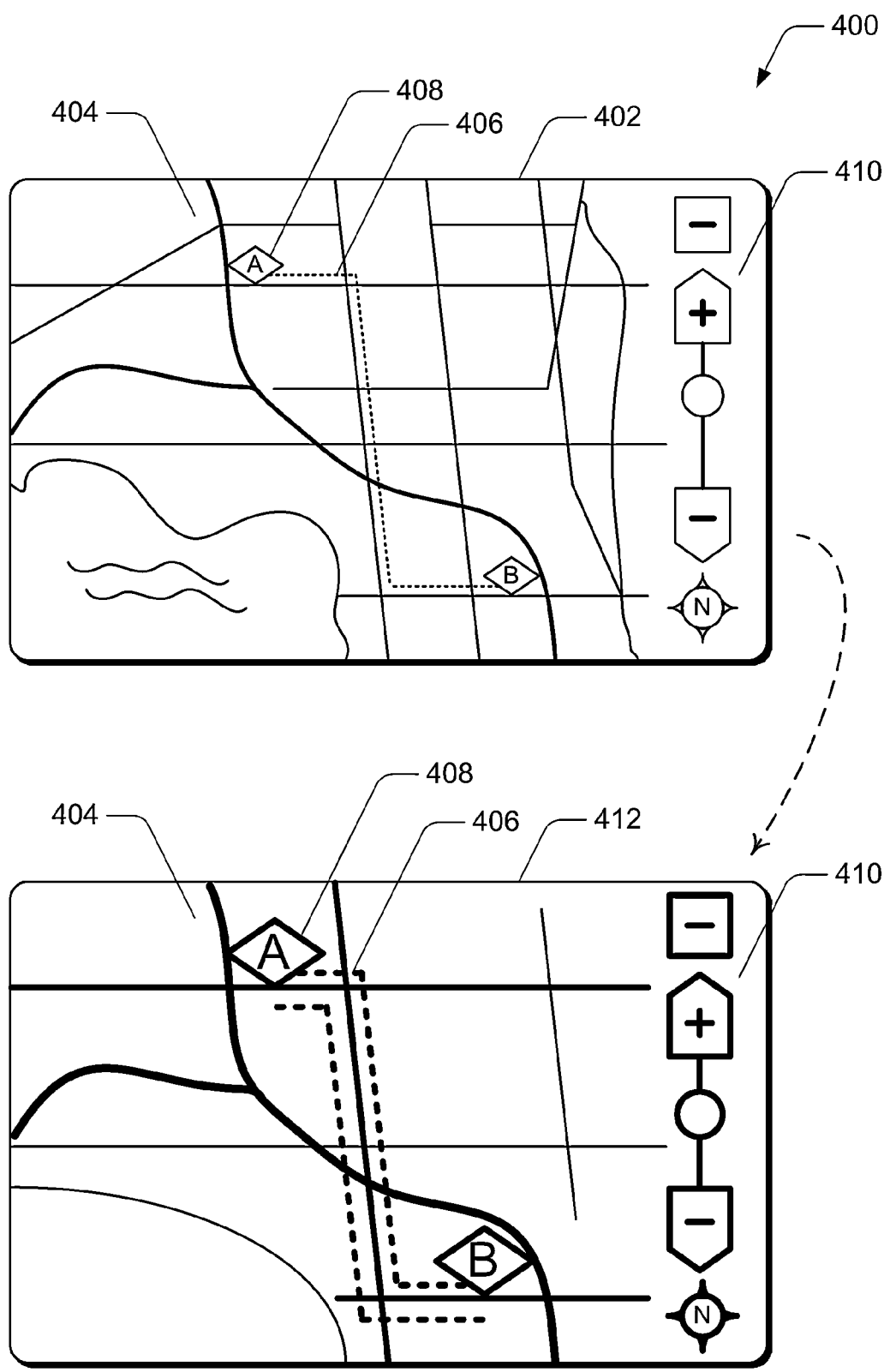
FIG. 4 illustrates an example of enhanced user interface elements in accordance with one or more embodiments.

FIG. 4 illustrates an example 400 of enhanced user interface elements in ambient light in accordance with one or more embodiments. Example 400 includes a user interface 402 illustrated as a navigation map for a mapping application. The user interface 402 includes various user interface elements, such as images 404 (e.g., roadways, bodies of water, an aerial photograph, and the like), graphics 406 (e.g., a designated route identified for a user), text 408, and selectable controls 410. The user interface 402 is an example display of the navigation map optimized for indoor lighting conditions, and shows detailed map information.

Example 400 also includes an enhanced user interface 412 that illustrates the navigation map in a bright ambient lighting condition, such as when a portable device is used outdoors or in a car, and bright sunlight makes it difficult to read the display of the navigation map. In the enhanced user interface 412, some of the map detail is omitted, the contrast is maximized, and the user interface elements are enhanced for visibility in the ambient light. For example, the images 404 (e.g., the streets and roadways) are thicker and/or change color as a background of the map washes out in the bright light. Further, the graphics 406 and text 408 are enlarged and enhanced, and the selectable controls 410 are enhanced for visibility in bright ambient light. In an alternate embodiment, the user interface of the navigation map can be enhanced for visibility in a dark ambient lighting environment.

Example method 500 is described with reference to FIG. 5 in accordance with one or more embodiments of enhanced user interface elements in ambient light. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example method 500 may be described in the general context of computer-executable instructions, which can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 5:
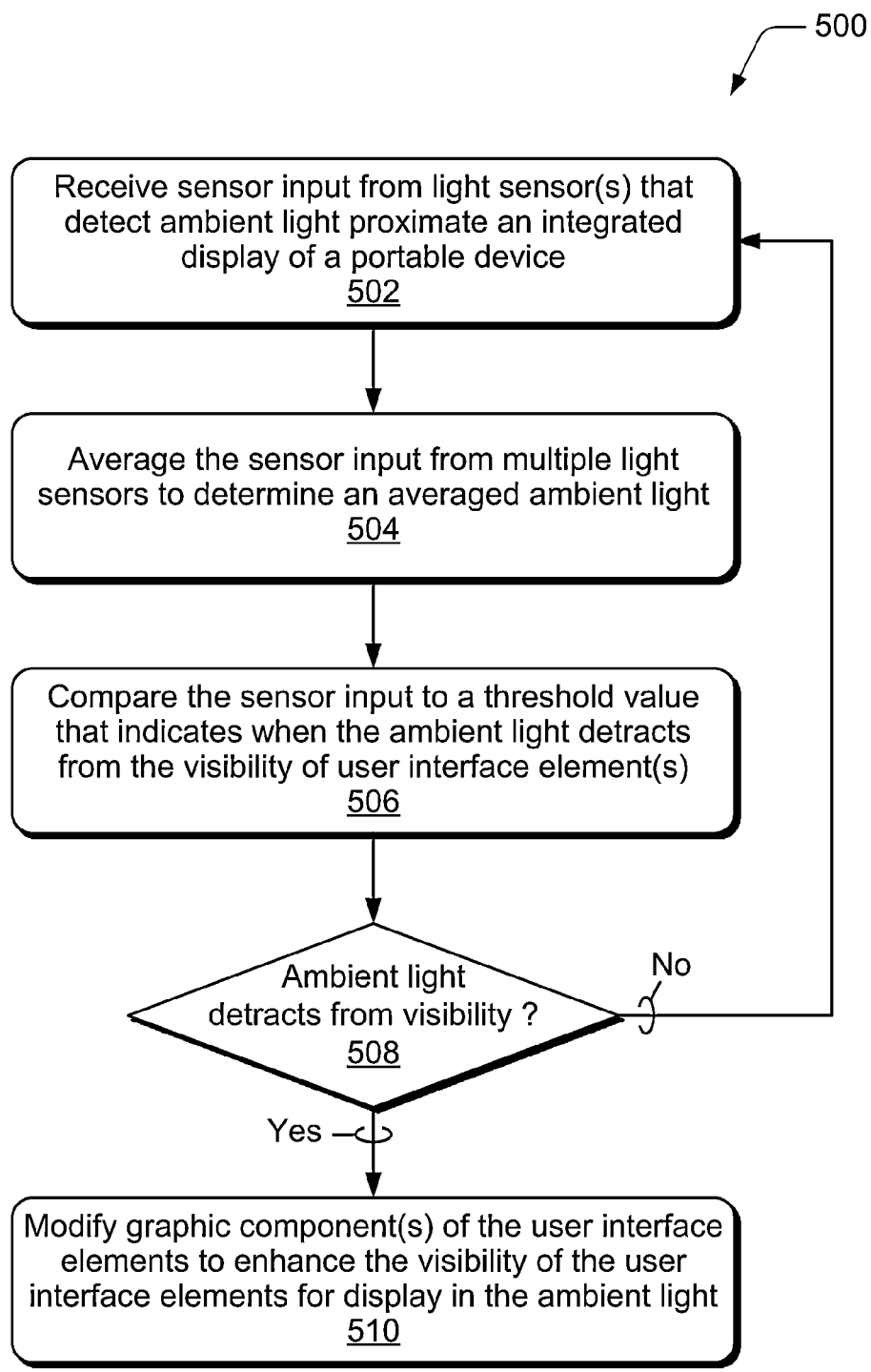
FIG. 5 illustrates example method(s) for enhanced user interface elements in ambient light in accordance with one or more embodiments.

FIG. 5 illustrates example method(s) 500 of enhanced user interface elements in ambient light. The order in which the method is described is not intended to be construed as a limitation, and any number of the described method blocks can be combined in any order to implement the method, or an alternate method.

At block 502, sensor input is received from light sensor(s) that detect ambient light proximate an integrated display of a portable device. For example, portable device 102 (FIG. 1) includes light sensor(s) 134 that detect ambient light that is local, incident, in a vicinity, or otherwise proximate the integrated display 112 of the portable device. The element display service 132 at portable device 102 receives the detected ambient light as sensor input 136.

At block 504, the sensor input from multiple light sensors is averaged to determine an averaged ambient light proximate the integrated display of the portable device. For example, portable device 102 can optionally include multiple light sensors 134 that detect ambient light proximate an integrated display of portable device 102. The element display service 132 at portable device 102 receives sensor input 136 from the multiple light sensors 134 and averages the sensor inputs to determine the averaged ambient light 142 that is local, incident, in a vicinity, or otherwise proximate the integrated display of the portable device.

At block 506, the sensor input is compared to a threshold value that indicates when the ambient light detracts from the visibility of user interface element(s) displayed in a user interface. For example, the element display service 132 at portable device 102 receives sensor input 136 and compares it to a sensor threshold value 144 that indicates when the ambient light detracts from the visibility of user interface elements on a user interface.

At block 508, a determination is made as to whether the ambient light detracts from the visibility of user interface elements displayed in a user interface on the integrated display. For example, the element display service 132 at portable device 102 determines whether the ambient light, as indicated by sensor input 136, detracts from the visibility of user interface elements displayed in a user interface. If the ambient light does not detract from the visibility of the user interface elements displayed in the user interface (i.e., "no" from block 508), then the method continues at block 502 to receive sensor input.

If the ambient light does detract from the visibility of the user interface elements displayed in the user interface (i.e., "yes" from block 508), then at block 510, graphic components of the user interface elements are modified to enhance the visibility of the user interface elements for display in the ambient light. For example, the element display service 132 at portable device 102 redefines vector graphics that each define one of the graphic components of a user interface element to modify the graphic components and enhance the visibility of the user interface element. Each of the user interface elements are individually enhanced for visibility in the ambient light, and/or the graphic components of a user interface element are individually modified to contrast with a user interface background displayed in a user interface. In an embodiment, the element display service 132 interpolates the display properties of the graphic components of a user interface element along a normalized light range to modify the graphic components to enhance the visibility of the user interface element for display in the ambient light.

Figure 6:
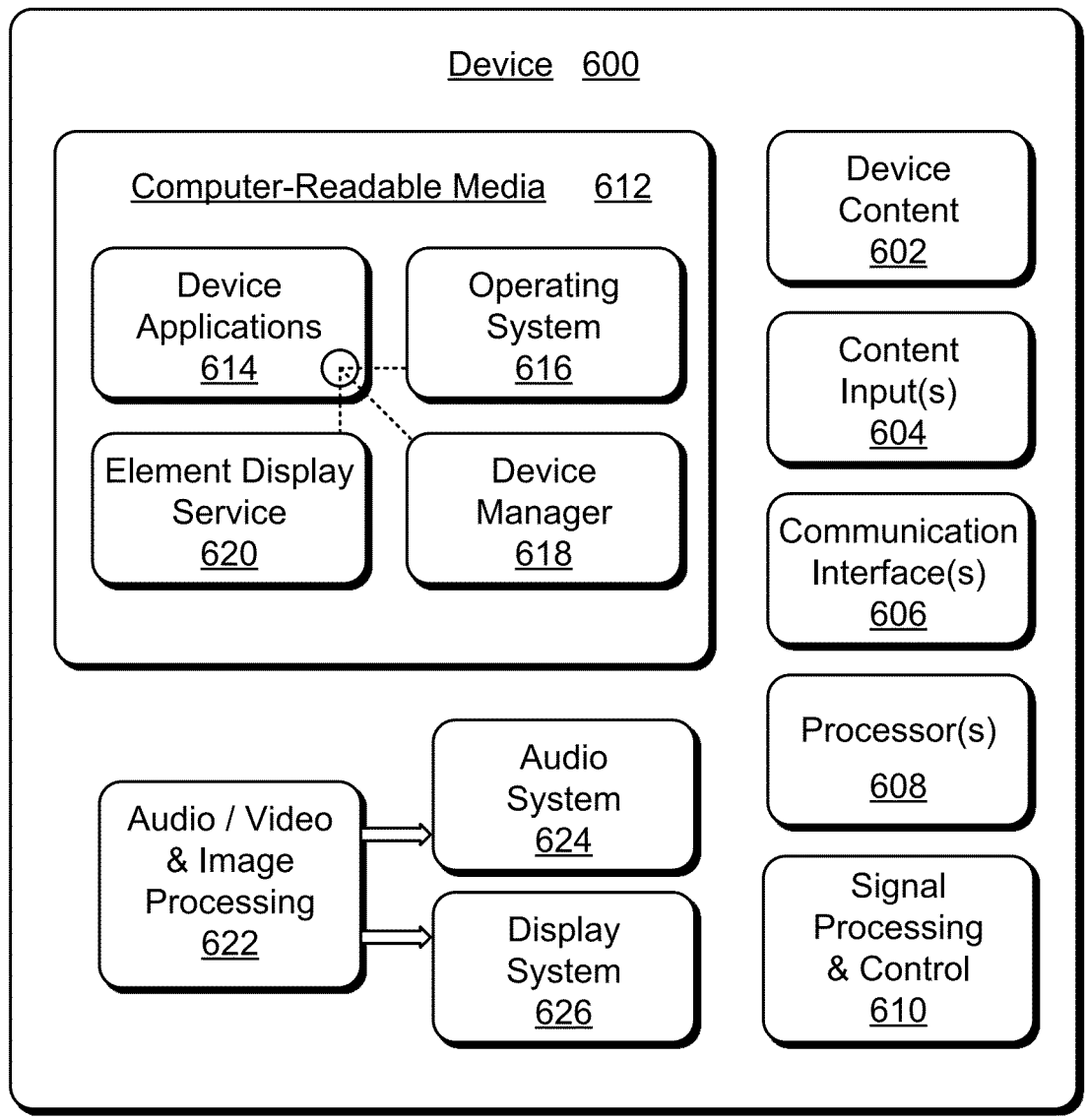
FIG. 6 illustrates various components of an example device that can implement embodiments of enhanced user interface elements in ambient light.

FIG. 6 illustrates various components of an example device 600 that can be implemented as any form of a portable, computing, electronic, appliance, and/or media device to implement various embodiments of enhanced user interface elements in ambient light. For example, device 600 can be implemented as portable device 102 as described with reference to FIG. 1.

Device 600 can include device content 602, such as configuration settings of the device, media content stored on the device, and/or information associated with a user of the device. Media content stored on device 600 can include any type of data as well as audio, video, and/or image media content. Device 600 can include one or more content inputs 604 via which media content can be received. In an embodiment, the content inputs 604 can include Internet Protocol (IP) inputs over which streams of media content are received via an IP-based network.

Device 600 further includes one or more communication interfaces 606 that can be implemented as any one or more of a serial and/or parallel interface, a wireless interface, any type of network interface, a modem, and as any other type of communication interface. The communication interfaces 606 provide a connection and/or communication links between device 600 and a communication network by which other electronic, computing, and communication devices can communicate data with device 600.

Device 600 can include one or more processors 608 (e.g., any of microprocessors, controllers, and the like) which process various computer-executable instructions to control the operation of device 600 and to implement embodiments of enhanced user interface elements in ambient light. Alternatively or in addition, device 600 can be implemented with any one or combination of hardware, firmware, or fixed logic circuitry that is implemented in connection with signal processing and control circuits which are generally identified at 610.

Device 600 can also include computer-readable media 612, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 612 provides data storage mechanisms to store the device content 602, as well as various device applications 614 and any other types of information and/or data related to operational aspects of device 600. For example, an operating system 616 can be maintained as a computer application with the computer-readable media 612 and executed on the processors 608. The device applications 614 can also include a device manager 618 and an element display service 620. In this example, the device applications 614 are shown as software modules and/or computer applications that can implement various embodiments of enhanced user interface elements in ambient light.

Device 600 can also include an audio, video, and/or image processing system 622 that provides audio data to an audio system 624 and/or provides video or image data to a display system 626. The audio system 624 and/or the display system 626 can include any devices or components that process, display, and/or otherwise render audio, video, and image data. The audio system 624 and/or the display system 626 can be implemented as integrated components of the example device 600. Alternatively, audio system 624 and/or the display system 626 can be implemented as external components to device 600. Video signals and audio signals can be communicated from device 600 to an audio device and/or to a display device via an RF (radio frequency) link, S-video link, composite video link, component video link, DVI (digital video interface), analog audio connection, or other similar communication link.

Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of enhanced user interface elements in ambient light have been described in language specific to features and/or methods, it is to be understood that the subject of the appended claims is not necessarily limited to the specific features or methods described. Rather, the specific features and methods are disclosed as example implementations of enhanced user interface elements in ambient light.

The invention claimed is:

1. A computer-implemented method, comprising:
   determining, by a user device, that ambient light detracts from visibility of a user interface element displayed in a user interface on a display of the user device;
   interpolating display properties of one or more graphic components of the user interface element through a light range from approximately complete darkness to full sunlight, said interpolating to determine at least one display property value, the display property value previously undetermined and located at an intermediate value within the light range by use of an equation; and
   modifying the one or more graphic components of the user interface element based on said interpolating the display properties within the light range to enhance the visibility of the user interface element for display in the ambient light, the one or more graphic components of the user interface element individually modified to contrast with a user interface background displayed in the user interface.

2. A computer-implemented method as recited in claim 1, further comprising redefining a vector graphic that defines each of the one or more graphic components of the user interface element to modify the one or more graphic components to enhance the visibility of the user interface element.

3. A computer-implemented method as recited in claim 1, further comprising comparing sensor input to a threshold value that indicates when the ambient light detracts from the visibility of the user interface element displayed in the user interface.

4. A computer-implemented method as recited in claim 1, further comprising averaging sensor input from multiple light sensors to determine an averaged ambient light.

5. A computer-implemented method as recited in claim 1, further comprising:
   determining that the ambient light detracts from the visibility of multiple user interface elements displayed in the user interface; and
   individually enhancing the visibility of each user interface element for display in the ambient light.

6. A computer-implemented method as recited in claim 1, further comprising:
   determining that the ambient light detracts from the visibility of multiple user interface elements displayed in the user interface; and
   individually modifying the one or more graphic components of each user interface element to enhance the visibility of the user interface elements for display in the ambient light.

7. A computer-implemented method as recited in claim 1, further comprising receiving sensor input from one or more light sensors that detect the ambient light.

8. A portable device, comprising:
   an integrated display configured to display a user interface;
   a processor system to implement an element display service that is configured to:
   determine that ambient light detracts from visibility of a user interface element displayed in the user interface;
   interpolate display properties of one or more graphic components of the user interface element through a light range from approximately complete darkness to full sunlight, the interpolation to determine at least one display property value at an intermediate value not previously determined within the light range based on two known display property values and an equation; and
   modify the one or more graphic components of the user interface element based on the interpolated display properties within the light range to enhance the visibility of the user interface element for display in the ambient light, the one or more graphic components of the user interface element individually modifiable to contrast with a user interface background displayed in the user interface on the integrated display.

9. A portable device as recited in claim 8, wherein the element display service is further configured to redefine a vector graphic that defines each of the one or more graphic components of the user interface element to modify the one or more graphic components to enhance the visibility of the user interface element.

10. A portable device as recited in claim 8, wherein the element display service is further configured to compare sensor input to a threshold value that indicates when the ambient light detracts from the visibility of the user interface element displayed in the user interface on the integrated display.

11. A portable device as recited in claim 8, wherein the element display service is further configured to average sensor input from multiple light sensors to determine an averaged ambient light proximate the integrated display.

12. A portable device as recited in claim 8, wherein the element display service is further configured to:
   determine that the ambient light detracts from the visibility of multiple user interface elements displayed in the user interface on the integrated display; and
   individually enhance the visibility of each user interface element for display in the ambient light.

13. A portable device as recited in claim 8, wherein the element display service is further configured to:
   determine that the ambient light detracts from the visibility of multiple user interface elements displayed in the user interface on the integrated display; and
   individually modify the one or more graphic components of each user interface element to enhance the visibility of the user interface elements for display in the ambient light.

14. A portable device as recited in claim 8, further comprising one or more light sensors configured to detect the ambient light proximate the integrated display and generate sensor input to the element display service.

15. One or more computer-readable memory storage devices comprising stored computer-executable instructions that, when executed by one or more processors, initiate an element display service to:
   determine that ambient light detracts from visibility of a user interface element displayed in a user interface;
   interpolate display properties of one or more graphic components of the user interface element through a light range from approximately complete darkness to full sunlight, the interpolation to determine at least one display property value at a previously undetermined intermediate value between two known display property values within the light range based on the two known display property values and an equation; and
   modify the one or more graphic components of the user interface element to contrast with a user interface background displayed in the user interface, the one or more graphic components modified based on the interpolated display properties within the light range to enhance the visibility of the user interface element for display in the ambient light.

16. One or more computer-readable memory storage devices as recited in claim 15, further comprising the stored computer-executable instructions that, when executed, initiate the element display service to redefine a vector graphic that defines each of the one or more graphic components of the user interface element to modify the one or more graphic components to enhance the visibility of the user interface element.

17. One or more computer-readable memory storage devices as recited in claim 15, further comprising the stored computer-executable instructions that, when executed, initiate the element display service to compare sensor input to a threshold value that indicates when the ambient light detracts from the visibility of the user interface element displayed in the user interface on the integrated display.

18. One or more computer-readable memory storage devices as recited in claim 15, further comprising the stored computer-executable instructions that, when executed, initiate the element display service to average sensor input from multiple light sensors to determine an averaged ambient light proximate the integrated display of the portable device.

19. One or more computer-readable memory storage devices as recited in claim 15, further comprising the stored computer-executable instructions that, when executed, initiate the element display service to:
   determine that the ambient light detracts from the visibility of multiple user interface elements displayed in the user interface on the integrated display; and
   individually enhance the visibility of each user interface element for display in the ambient light.

20. One or more computer-readable memory storage devices as recited in claim 15, further comprising the stored computer-executable instructions that, when executed, initiate the element display service to:
- determine that the ambient light detracts from the visibility of multiple user interface elements displayed in the user interface on the integrated display; and
- individually modify the one or more graphic components of each user interface element to enhance the visibility of the user interface elements for display in the ambient light.

\* \* \* \* \*